US006668682B1

(12) United States Patent
Emeneth et al.

(10) Patent No.: US 6,668,682 B1
(45) Date of Patent: Dec. 30, 2003

(54) STEERING WHEEL COMPRISING A DECORATIVE COVERING

(75) Inventors: Jakob Emeneth, Goldbach (DE); Benno Rosenberger, Moembris (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 09/744,511

(22) PCT Filed: Jul. 13, 1999

(86) PCT No.: PCT/DE99/02188

§ 371 (c)(1),
(2), (4) Date: Jan. 23, 2001

(87) PCT Pub. No.: WO00/05123

PCT Pub. Date: Feb. 3, 2000

Related U.S. Application Data

(63) Continuation-in-part of application No. 09/355,382, filed on Jul. 26, 1999, now Pat. No. 6,418,814.

(30) Foreign Application Priority Data

Jul. 23, 1998 (DE) ......................................... 298 13 895

(51) Int. Cl.[7] ................................................. B62D 1/06
(52) U.S. Cl. .......................................... 74/552; 74/558
(58) Field of Search ....................... 74/552, 558, 558.5, 74/557; 280/750; 156/293, 267; 264/46.4

(56) References Cited

U.S. PATENT DOCUMENTS 3,726,152 A * 4/1973 Tsuneizumi .................. 74/552
5,792,302 A * 8/1998 Nakada et al. ............... 156/293
5,840,144 A * 11/1998 Schumacher et al. ........ 156/267
6,012,354 A * 1/2000 Futschik et al. .............. 74/558
6,418,814 B1 * 7/2002 Emeneth et al. .............. 74/552
2001/0027698 A1 * 10/2001 Fleckenstein ................. 74/552
2002/0008097 A1 * 1/2002 Hobby ......................... 219/204
2002/0029650 A1 * 3/2002 Emeneth et al. .............. 74/552

FOREIGN PATENT DOCUMENTS

| DE | 4039138 C1 | * 2/1992 | ................. 74/552 |
| DE | 44 18 960 A 1 | 12/1995 | |
| DE | 297 02 241 | 5/1997 | |
| DE | 298 03 133 | 5/1998 | |
| DE | 298 13 895 | 11/1998 | |
| EP | 1029769 A | * 8/2000 | ................. 74/552 |

* cited by examiner

Primary Examiner—Vinh T. Luong
(74) Attorney, Agent, or Firm—Foley & Lardner

(57) ABSTRACT

The invention relates to a steering wheel comprising a decorative covering, whereby a steering wheel frame having a steering wheel rim insert and spokes is at least partially covered in sections with foam and is provided with the decorative covering in sections, especially with a decorative wood. According to the invention, the steering wheel frame is provided with a foam sheathing in the areas (3, 4) which are provided for the decorative covering and which comprise outer dimensions that are smaller than those of the remaining areas. In addition, the invention provides that at least one dimensionally stable decorative covering part is fastened on said foam sheathing, and at least one centering means is provided between the foam sheathing and the decorative covering part.

21 Claims, 7 Drawing Sheets

STEERING WHEEL COMPRISING A DECORATIVE COVERING

CROSS REFERENCE TO RELATED APPLICATIONS

This application is a continuation-in-part of U.S. patent application Ser. No. 09/355,382 filed Jul. 26, 1999, (now U.S. Pat. No. 6,418,814), which claims priority to International Application No. PCT/DE98/00321 and German Patent Application DE 297 02 241.

BACKGROUND OF THE INVENTION

The invention relates to a steering wheel with a decorative covering.

Steering wheels generally comprise a steering wheel frame with a steering wheel rim insert and spokes, which are sheathed in a layer of foam, for example of polyurethane. In addition, some steering wheels are provided with a decoration, for example with a wood decoration. For instance, DE 44 18 960 A1 discloses a covering part with a visible wood surface which has a load-bearing structural part consisting of dimensionally stable material which is connected to a covering forming the visible side. The load-bearing structural part, which preferably comprises two shell parts which can be placed one against the other, is fastened directly to the steering wheel rim insert. The latter has a substantially square cross section, to which the inner side of the load-bearing structural part is adapted. This cross section ensures that the load-bearing structural part cannot twist during fitting and consequently the decoration lies in the same place on every steering The disadvantage is that, in the case of a steering wheel rim insert of a circular cross section, twisting of the load-bearing structural part is possible during fitting unless a device is used.

Apart from the square and circular cross sections mentioned of the steering wheel rim insert, other cross sections are also known. The load-bearing structural part must be adapted on its inner side to these respective cross sections.

This gives rise to the disadvantage that a special load-bearing structural part has to be provided in each case for different steering wheel rim inserts.

SUMMARY OF THE INVENTION

The invention is direct to being able to fit and design a load-bearing structural part, which is referred to below as the decorative covering part, in a manner which is secure with regard to twisting independently of the cross section of the steering wheel rim insert.

According to the invention, this is achieved by arrangement wherein, in the case of a steering wheel with decorative covering, a steering wheel frame with a steering wheel rim insert and spokes being sheathed in foam at least in certain sections and being provided with the decorative covering, in particular with a wood decoration. The steering wheel frame is provided in the regions intended for the decorative covering with a foam sheathing which has smaller outer dimensions than in the remaining regions which define sections which are uncovered by the decorative covering section. Fastened on this foam sheathing is at least one dimensionally stable decorative covering part, at least one centering means being provided between the foam sheathing and the covering part.

This construction of the steering wheel has the advantage that the outer contour of the cross section of the foam sheathing can remain the same, independently of the cross section of the steering wheel rim insert, so that the inner contour of the decorative covering part can likewise remain the same. Even if the foam sheathing has a circular cross section, twisting of the decorative covering part during fitting is not possible because of the centering means provided.

It is expedient that the foam sheathing has as a centering means in the region of at least one decorative covering part at least one round hole, which is assigned on the decorative covering part (5, 6) two crossing webs, the length of which corresponds to the diameter of the hole, so that the webs bear with their end faces against the wall of the-hole.

In one embodiment, two decorative covering parts reaching around the steering wheel rim are arranged in at least one region of the steering wheel and engage in one another at their contact surfaces. The decorative covering preferably comprises an upper half and a lower half. The upper half lies in its upper section against the foam sheathing and is provided there as the centering means. The lower half extends at a distance from the foam sheathing and is connected to the latter via at least one web.

The decorative covering parts preferably consist of dimensionally stable and temperature-resistant plastic. The decoration is expediently adhesively attached as a layer of veneer or film on the decorative covering parts. In other embodiments, a coating or a layer of metal is applied, for example, by electroplating, vapor depositing or flame spraying as decoration.

In one embodiment, the decorative covering is provided on the steering wheel rim in the region where the spokes adjoin and encloses the latter at least in certain sections.

In one embodiment, the decorative covering parts are expediently connected to the foam sheathing by adhesive bonding. In another embodiment, the decorative covering parts are adhesively bonded or welded to one another at their joins. In particular, the joins may be connected to one another by electromagnetic welding with thermoplastic welding filler. The electromagnetic welding takes place by means of process steps known per se.

While adhesives can act chemically on plastics, this risk does not arise in the case of welding. For these reasons, large gaps, which are necessary for tolerance reasons, can be filled by the filler.

For concealing the joins of the decorative connecting parts, a gap which has, for example, at least approximately a wedge-shaped cross section may be provided on the outer side of the decorative connecting parts.

In other embodiments, for concealing the joins a trim cord is in each case placed in the latter or the joins are covered by the decorative medium.

BRIEF DESCRIPTION OF THE DRAWINGS

The invention is to be explained in exemplary embodiments with reference to drawings, in which.

DETAILED DESCRIPTION OF THE PREFERRED EMBODIMENTS

Figure 1:
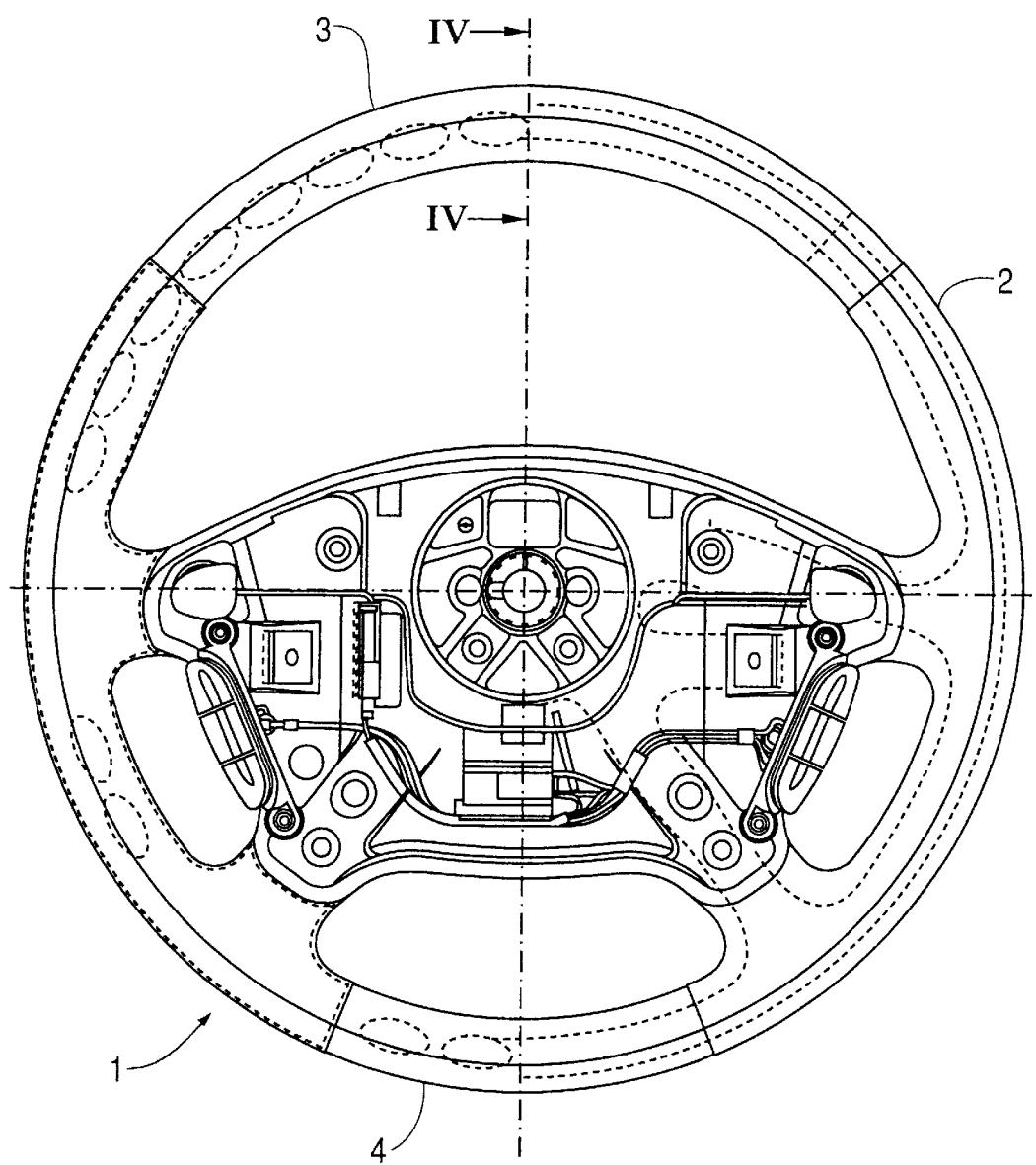
FIG. 1 shows a plan view of a steering wheel.
Figure 2:
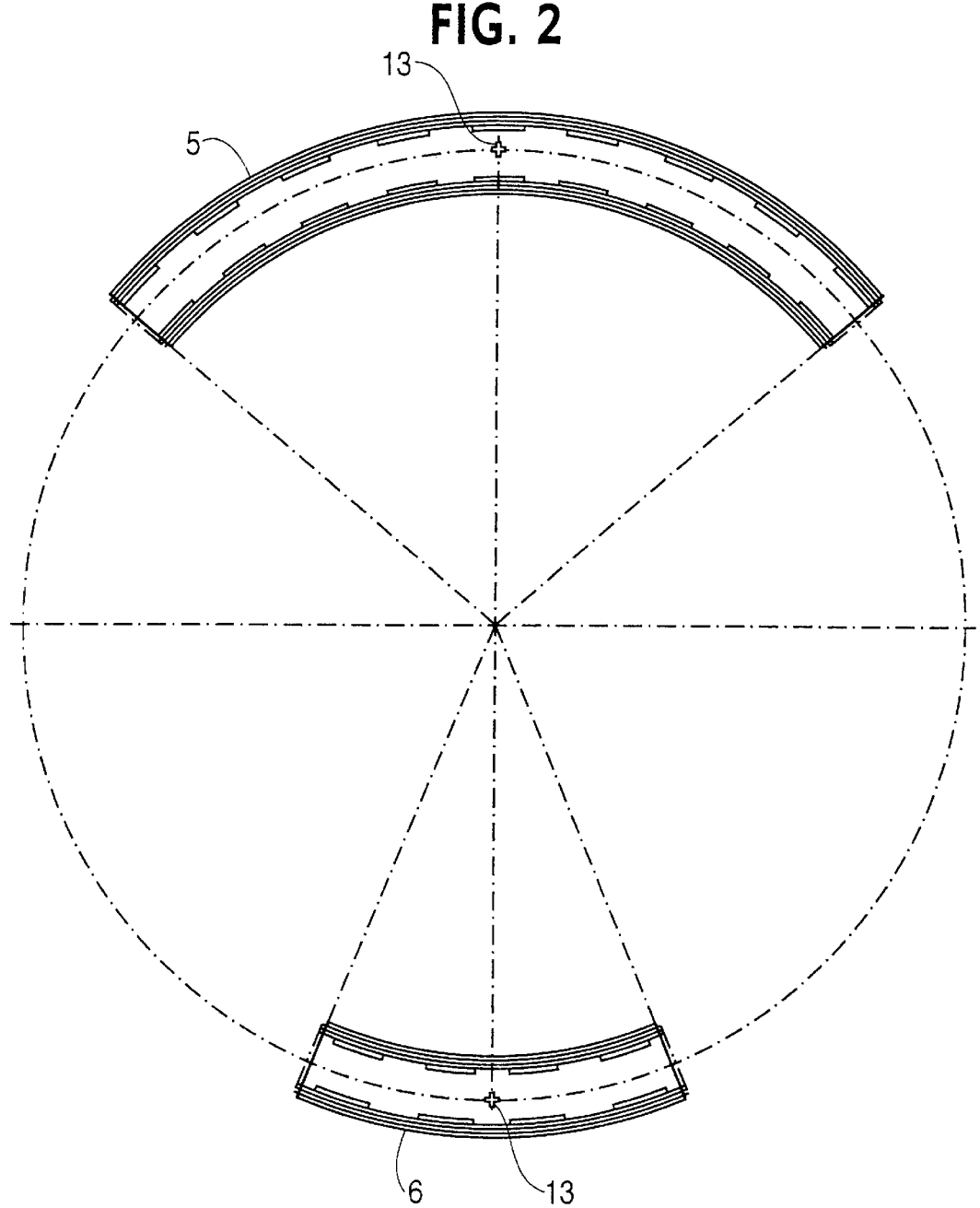
FIG. 2 shows the position of upper covering half-shells on the steering wheel according to FIG. 1.
Figure 3:
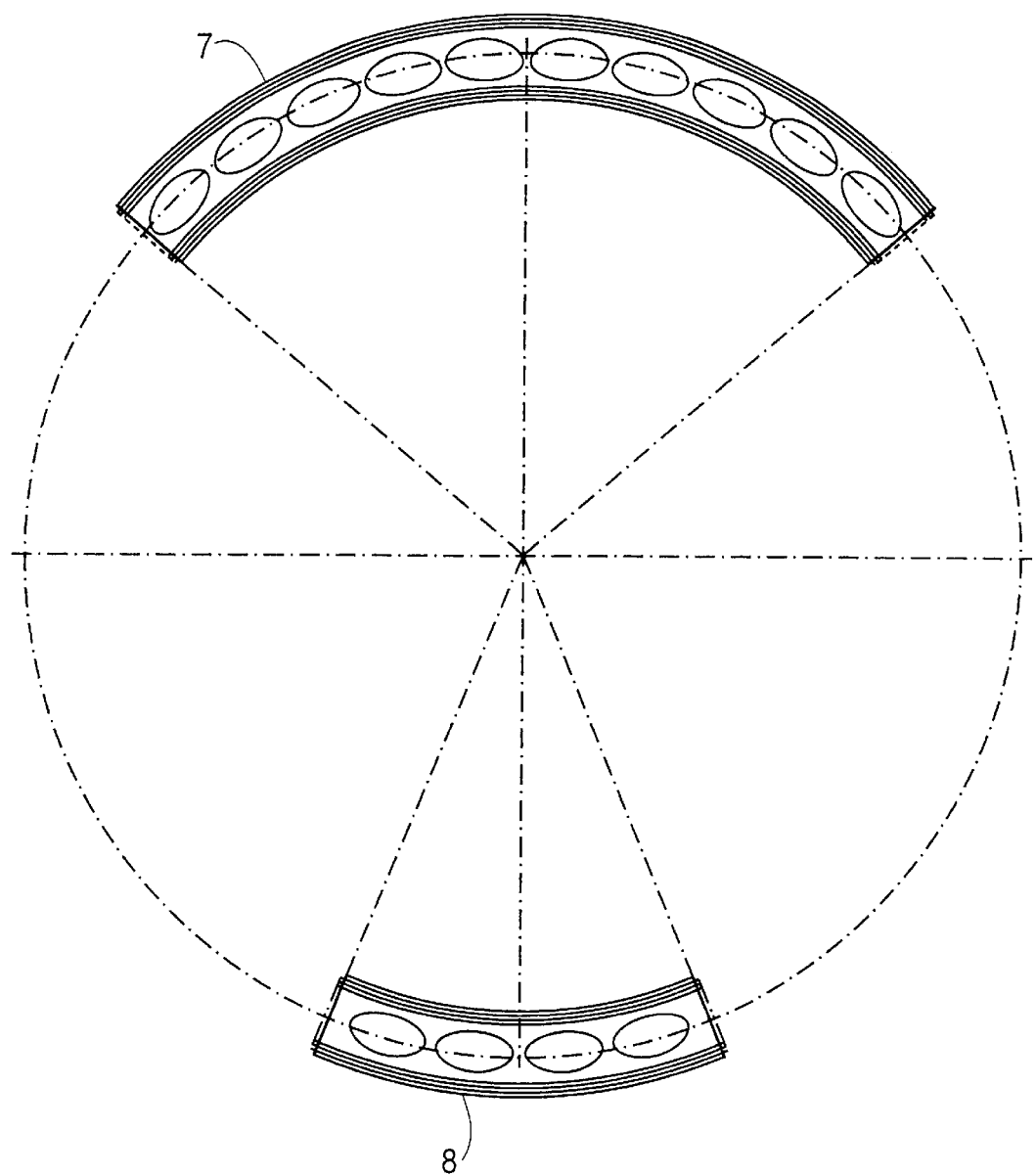
FIG. 3 shows the position of lower covering half-shells on the steering wheel according to FIG. 1.

In the case of the steering wheel 1 represented in FIG. 1, decorative coverings are provided in spoke-free regions 3, 4 of the steering wheel rim 2. These coverings comprise upper parts 5 and 6 (FIG. 2), to which lower parts 7 and 8, respectively, (FIG. 3) are assigned.

Figure 4:
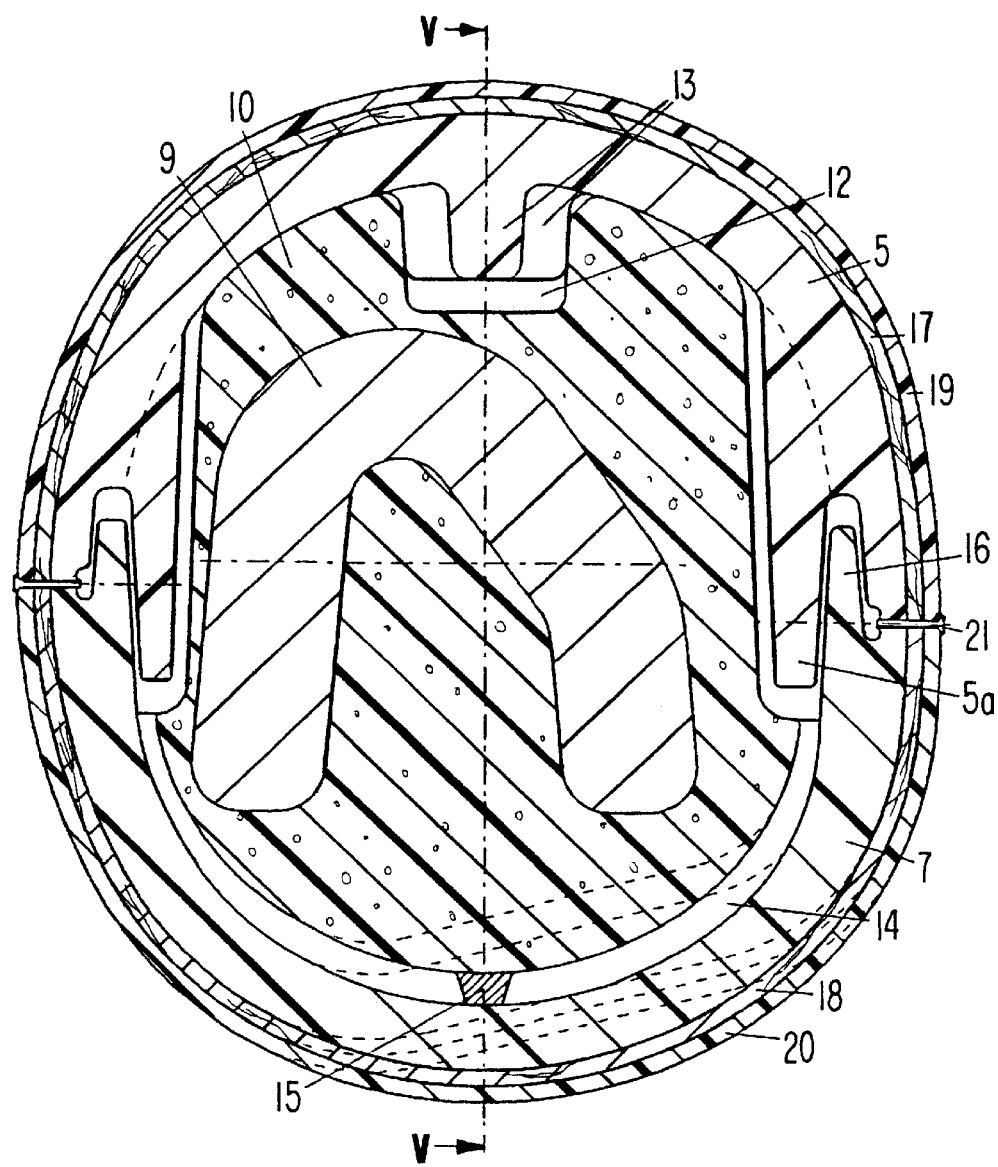
FIG. 4 shows a section through the steering wheel rim corresponding to the line IV—IV according to FIG. 1.
Figure 5:
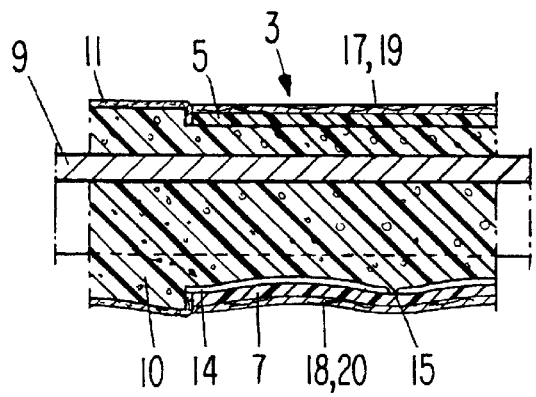
FIG. 5 shows a section represented on a reduced scale in comparison with FIG. 4 through this figure along the line V—V.

The cross section of the said parts of the steering wheel rim 2 can be seen from FIG. 4. Said rim has a steering wheel rim insert 9, which is surrounded by a foam sheathing 10, for example of PU foam. Said insert has in the spoke-free regions 3 and 4, in which the decorative covering is attached, smaller outer dimensions than in the neighboring regions, in which the steering wheel rim is sheathed in a customary covering 11, for example of leather (FIG. 5). In this case, the outer dimensions are chosen such that the regions of the steering wheel rim provided with the decorative covering end flush with the remaining regions or are set back slightly from the latter. On the upper side, a round hole 12 for the engagement of two crossing webs 13 of the upper part 5 is provided in the foam sheathing. Corresponding webs 13 are also provided on the upper part 6.

The upper part 5 is designed as a half-shell and consists of dimensionally stable and temperature-resistant plastic. In the upper section, the inner contour of the upper part 5 corresponds to the outer contour of the foam sheathing 10. Attached on the inner side of the upper part 5 is a guide strip 5a to facilitate fitting and centering. This strip may also be of a segmental form.

Between the lower part 7, likewise designed as a half-shell, and the foam sheathing 10 there is an intermediate space 14. A connection between the two parts exists via a web 15. The lower part 7 has in the region of the contact surfaces with the upper part 5 an inner border 16, which grips behind the upper part 5. The outer sides of the two parts extend flush with respect to one another, so that the steering wheel rim has a smooth outer surface. The upper part and lower part are adhesively bonded to one another in the region of the contact surfaces.

In the present exemplary embodiment, the upper part 5 and the lower part 7 are separately provided with adhesively attached wood veneer 17 and 18, respectively. This has subsequently been sealed with layers of polyester coating 19 and 20, respectively. At the seam between the upper part 5 and the lower part 7, a trim cord 21 is provided in the present exemplary embodiment.

Figure 6A:
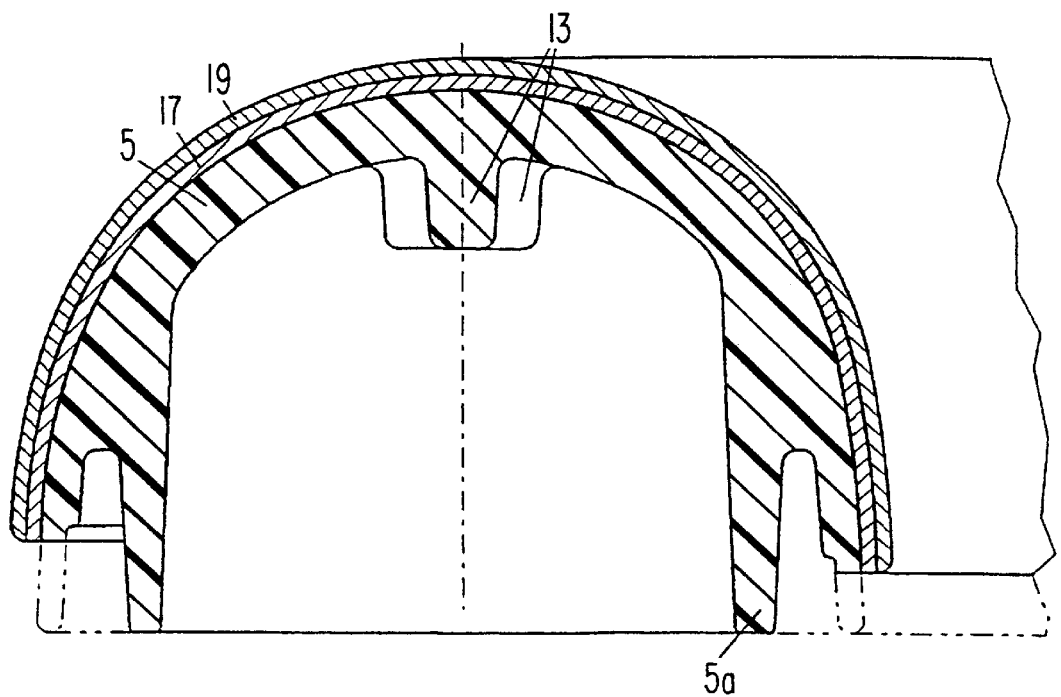
FIGS. 6a and 6b show as individual parts the covering parts which can be seen in FIG. 4.
Figure 6B:
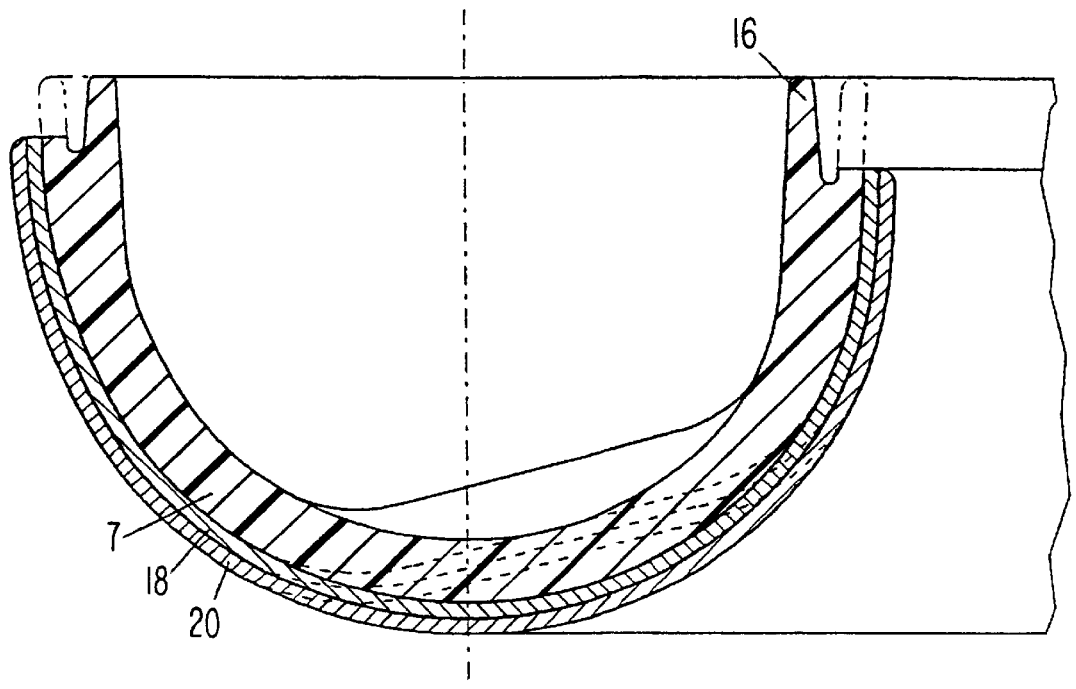

The exemplary embodiment reveals that, because of the use of the foam sheathing for the fastening of the decorative covering, the latter can be shaped independently of the cross section of the steering wheel rim insert. With the same diameter of the steering wheel, the same decorative coverings can therefore be used for different cross sections of the steering wheel rim insert. The upper part and the lower part are individually represented once again in FIGS. 6a and 6b.

The construction of the steering wheel rim represented in FIG. 4 in the region of the upper part 5 and of the lower part 7 also applies to the region of the upper part 6 and of the lower part 8.

Figure 7:
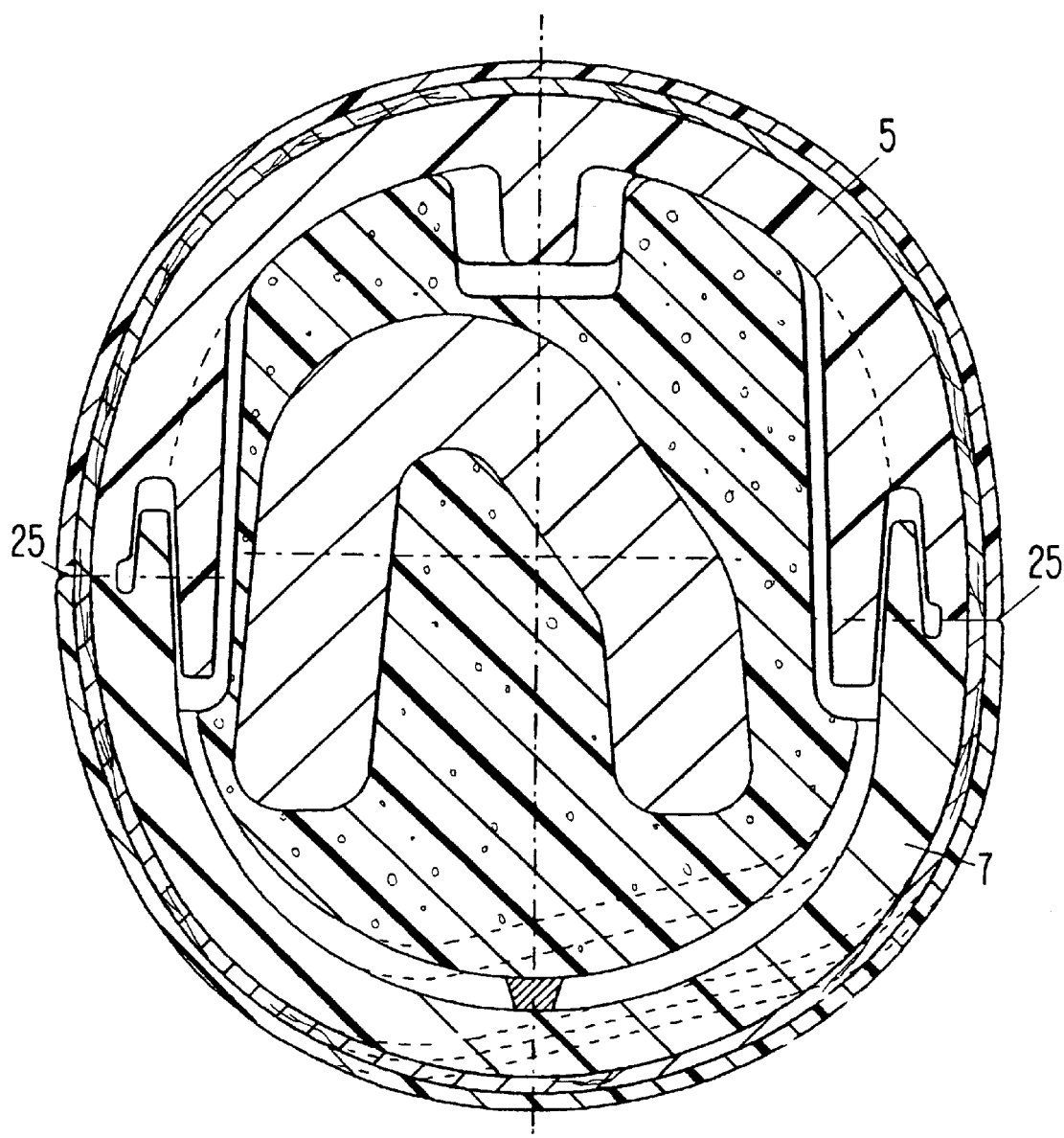
FIG. 7 shows a section corresponding to FIG. 4 through another embodiment of the steering wheel rim.

The exemplary embodiment of FIG. 7 substantially corresponds to the exemplary embodiment of FIG. 4. As a departure from the latter, however, no trim cord is provided for concealing the joins between the upper part 5 and the lower part 7, but instead gaps 25 which have an approximately wedge-shaped cross section are provided between the two.

Figure 8:
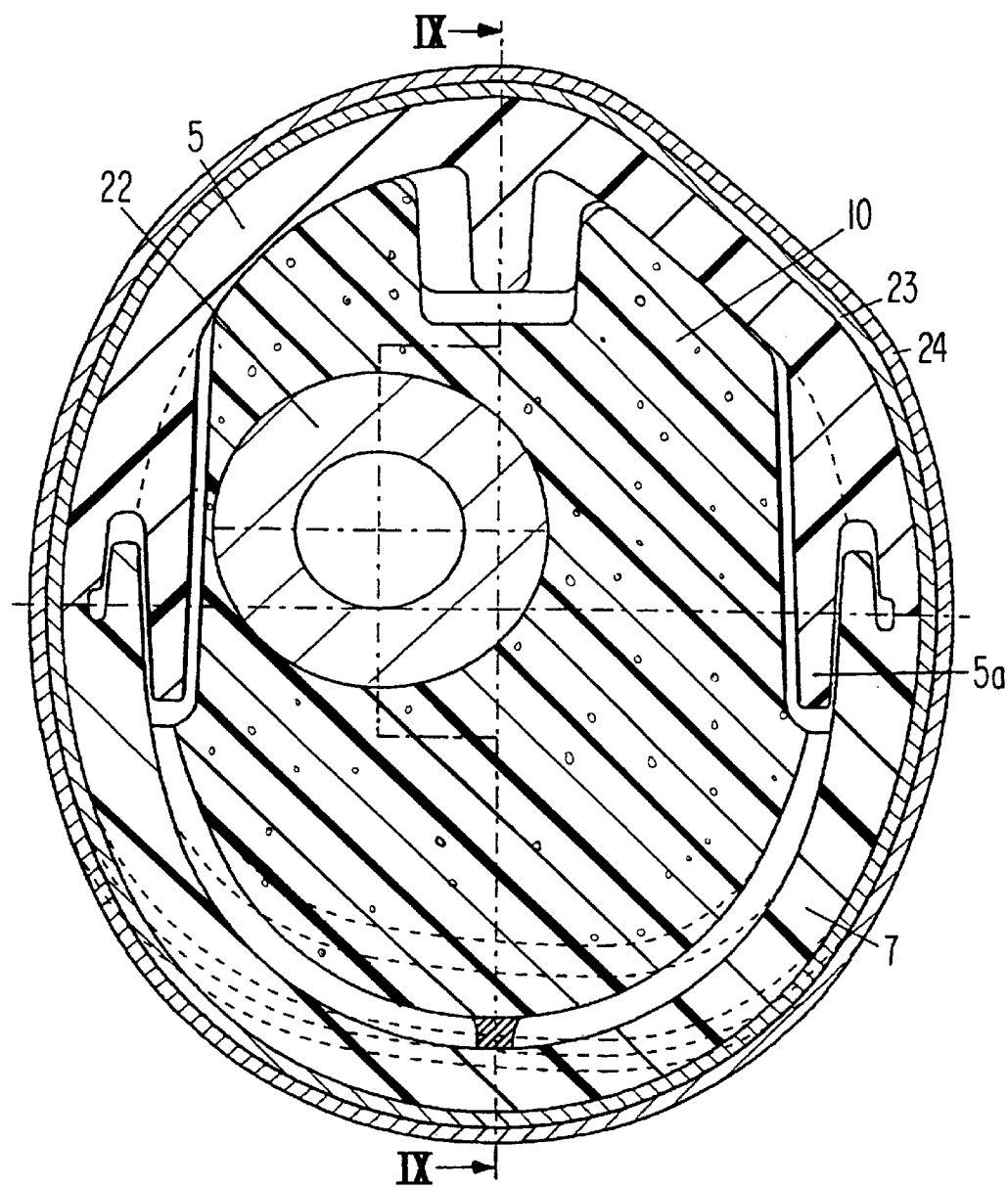
FIG. 8 shows a section corresponding to FIG. 4 through a further embodiment of the steering wheel rim.
Figure 9:
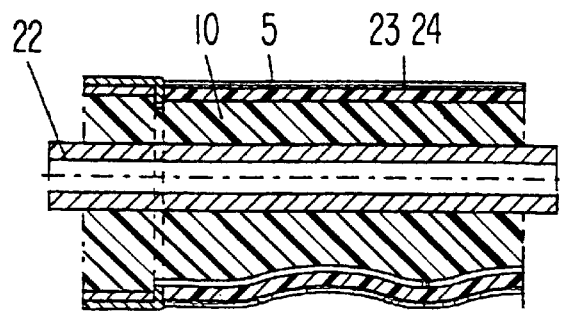
FIG. 9 shows a section through FIG. 8 along the line VII—VII, which is represented on a reduced scale in comparison with FIG. 7.

In the case of the exemplary embodiment of FIGS. 8 and 9, a steering wheel rim insert 22 of a circular cross section is provided. For this cross section, the advantage of the arrangement according to the invention becomes particularly clear, since, with direct fastening of the decorative covering parts on this steering wheel rim insert of circular cross section, an exact positioning of these parts would not be possible without a device. As a departure from the first exemplary embodiment, no separate layers of veneer and coating are provided on the upper part 5 and lower part 7, but instead these parts are provided after fitting on the foam sheathing 10 with an adhesively attached single layer of veneer 23, which is subsequently sealed with a layer of coating 24.

What is claimed is:

1. Steering wheel comprising:

at least one decorative covering part, a steering wheel rim insert, and spokes, wherein the steering wheel rim insert includes a foam sheathing having a covered section covered by the decorative covering part and-an uncovered section not covered by the decorative covering part, a perimeter of the covered section of the sheathing having smaller outer dimensions than the outer dimensions of a perimeter of the uncovered section of the sheathing, and wherein a centering structure is provided between the foam sheathing and the decorative covering part, the centering structure interconnecting the sheathing and the decorative covering part and being configured to maintain the decorative covering part in a predetermined position relative to the foam sheathing.

2. Steering wheel according to claim 1, wherein the centering structure, comprises at least one round hole in the foam sheathing, and two crossing webs, the length of which essentially correspond to the diameter of the hole, on the decorative covering part.

3. Steering wheel according to claim 1, wherein two decorative covering parts reaching around the steering wheel rim are arranged in at least one region of the steering wheel and engage in one another at their contact surfaces.

4. Steering wheel according to claim 3, wherein the decorative covering comprises an upper half and a lower half, and wherein the upper half lies in its upper section against the foam sheathing and is provided there as the centering means, and wherein the lower half extends at a distance from the foam sheathing and is connected to the latter by at least one web.

5. Steering wheel according to claim 1, wherein the at least one decorative covering part comprises dimensionally stable and temperature-resistant plastic.

6. Steering wheel according to claim 1, further comprising a decoration adhesively attached as one of a layer of veneer and a film on the decorative covering part.

7. Steering wheel according to claim 1, wherein a coating is provided on the decorative covering part as a decoration.

8. Steering wheel according to claim 1, wherein a layer of metal is provided on the decorative covering part as a decoration.

9. Steering wheel according to claim 8, wherein the layer of metal applied by electroplating, vapor depositing or flame spraying is provided.

10. Steering wheel according claim 1, wherein the decorative covering part is connected to the foam sheathing by adhesive bonding.

11. Steering wheel according to claim 3, wherein the decorative covering parts are adhesively bonded or welded to one another at joints therebetween.

12. Steering wheel according to claim 11, wherein the joints are connected to one another by electromagnetic welding with thermoplastic welding filler.

13. Steering wheel according to claim 3, wherein, for concealing joints of the decorative connecting parts, a gap is provided on the outer side of the decorative connecting parts.

14. Steering wheel according to claim 13, wherein the gap has an essentially wedge-shaped cross section.

15. Steering wheel according to claim 3, wherein a trim cord is placed in the joints of the decorative connecting parts.

16. Steering wheel according to claim 3, wherein the joints of the decorative connecting parts are covered by a decorative medium.

17. Steering wheel according to claim 1, wherein the decorative covering part is provided on the steering wheel rim in a region where the spokes adjoin and wherein the decorative covering part encloses.

18. A steering wheel comprising:

a rim;

a rim insert, said rim insert being offset with respect to a center line of the rim;

a foam sheathing disposed over at least a portion of the rim insert;

a decorative part disposed over and directly on at least a part of the foam sheathing; and a centering structure interconnecting the foam sheathing and the decorative covering and being configured to maintain the decorative covering in a predetermined position relative to the foam sheathing.

19. A steering wheel as claimed in claim 18, wherein the rim insert has an inverted V-shaped cross-section.

20. A steering wheel as claimed in claim 18, wherein the rim insert is tubular and offset from the center line of the rim so that the center line of the rim passes through a wall of the tubular rim insert.

21. A steering wheel comprising:

a rim insert;

a foam sheathing disposed over at least a portion of the rim insert, the rim having a shape which prevents relative movement between the rim and the foam sheath;

a decorative part disposed directly on the foam sheathing; and a centering structure which directly interconnects the foam sheathing and the decorative part and which locates and holds the decorative part in a predetermined position on the foam sheathing.

* * * * *